US009274786B2

(12) United States Patent
Ji

(10) Patent No.: US 9,274,786 B2
(45) Date of Patent: Mar. 1, 2016

(54) VEHICLE INFORMATION UPDATE METHOD AND APPARATUS

(71) Applicant: Hyundai Motor Company, Seoul (KR)

(72) Inventor: Myoung Kyoung Ji, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/541,478

(22) Filed: Nov. 14, 2014

(65) Prior Publication Data

US 2015/0178067 A1    Jun. 25, 2015

(30) Foreign Application Priority Data

Dec. 24, 2013    (KR) .......................... 10-2013-0162186

(51) Int. Cl.
   *G06F 9/44*    (2006.01)
   *G06F 9/445*   (2006.01)
   *G01C 21/36*   (2006.01)
   *H04B 5/00*    (2006.01)

(52) U.S. Cl.
   CPC    *G06F 8/65* (2013.01); *G01C 21/36* (2013.01); *H04B 5/0025* (2013.01)

(58) Field of Classification Search
   CPC ........................................................ G06F 8/65
   USPC ........................................................ 717/170
   See application file for complete search history.

(56) References Cited

U.S. PATENT DOCUMENTS

| | | | |
|---|---|---|---|
| 2004/0078781 A1* | 4/2004 | Novy et al. | 717/114 |
| 2004/0137892 A1 | 7/2004 | Hanood | |
| 2005/0262539 A1* | 11/2005 | Barton | G11B 27/034 725/90 |
| 2007/0169078 A1* | 7/2007 | Li | G06F 8/65 717/168 |
| 2008/0046557 A1* | 2/2008 | Cheng | 709/224 |
| 2009/0260001 A1* | 10/2009 | Park | H04L 41/082 717/173 |
| 2010/0182961 A1* | 7/2010 | Kim et al. | 370/329 |
| 2011/0143661 A1* | 6/2011 | Hartwig | G06F 8/65 455/41.1 |
| 2012/0167071 A1* | 6/2012 | Paek | 717/170 |
| 2012/0252420 A1* | 10/2012 | Czaja et al. | 455/414.1 |

(Continued)

FOREIGN PATENT DOCUMENTS

| | | |
|---|---|---|
| JP | 2002-221425 A | 8/2002 |
| JP | 2005-124237 A | 5/2005 |

(Continued)

OTHER PUBLICATIONS

Siira et al. "Location-based Mobile Wiki using NFC Tag Infrastructure", 2009, IEEE.*

(Continued)

*Primary Examiner* — Anna Deng
*Assistant Examiner* — Junchun Wu
(74) *Attorney, Agent, or Firm* — Mintz Levin Cohn Ferris Glovsky and Popeo, P.C.; Peter F. Corless

(57) ABSTRACT

A vehicle information update method in a mobile device having near field communication (NFC) functionality includes: receiving software version information from an in-vehicle device through NFC tagging, transmitting a predetermined control message including the software version information to an update server using a first wireless access means, receiving latest software corresponding to the software version information from the update server using a second wireless access means, and transmitting the received latest software to the in-vehicle device using a third wireless access means in a vehicle.

14 Claims, 7 Drawing Sheets

(56) References Cited

U.S. PATENT DOCUMENTS

| | | | | |
|---|---|---|---|---|
| 2013/0145360 | A1* | 6/2013 | Ricci | G06F 9/54 717/174 |
| 2014/0026113 | A1* | 1/2014 | Farooqi | G06F 8/36 717/107 |
| 2014/0142783 | A1* | 5/2014 | Grimm et al. | 701/2 |
| 2014/0187148 | A1* | 7/2014 | Taite | H04M 1/7253 455/41.1 |
| 2014/0197927 | A1* | 7/2014 | Kwon | H04B 5/0062 340/10.1 |
| 2014/0324340 | A1* | 10/2014 | Nishida | 701/519 |

FOREIGN PATENT DOCUMENTS

| | | |
|---|---|---|
| JP | 2010-78533 | 4/2010 |
| KR | 10-2006-000855 | 1/2006 |
| KR | 10-2008-0099608 | 11/2008 |
| KR | 20-2011-0006256 U | 6/2011 |
| KR | 10-1082628 | 11/2011 |
| KR | 10-2012-0071243 A | 7/2012 |
| KR | 10-2013-0021883 A | 3/2013 |
| KR | 10-2013-0025559 | 3/2013 |

OTHER PUBLICATIONS

Pesonen et al. "Near field communication technology in tourism", 2012, Elsevier Ltd. pp. 11-18.*

Michahelles et al. "Pervasive RFID and Near Field Communication Technology", 2007, IEEE.*

* cited by examiner

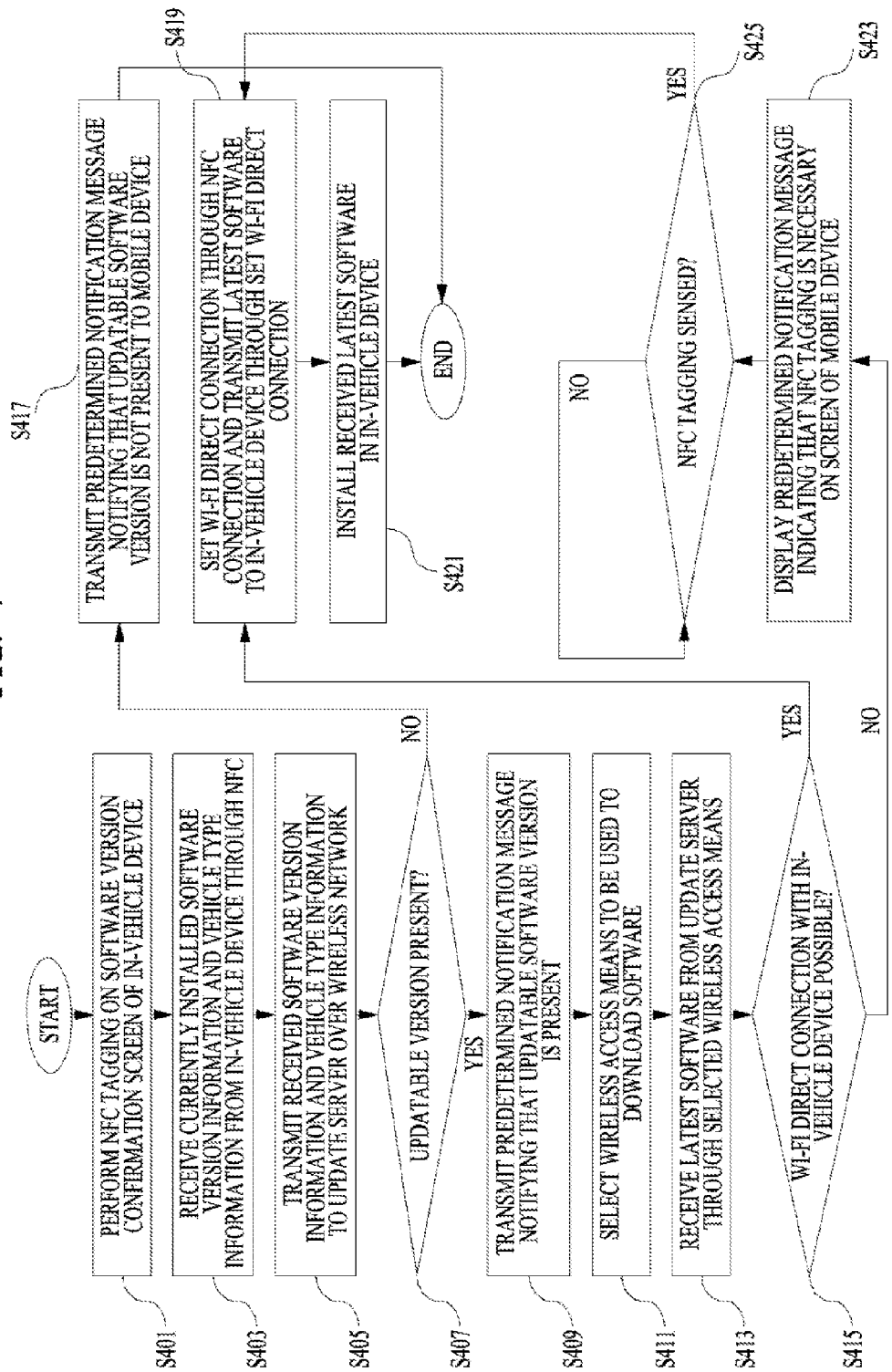

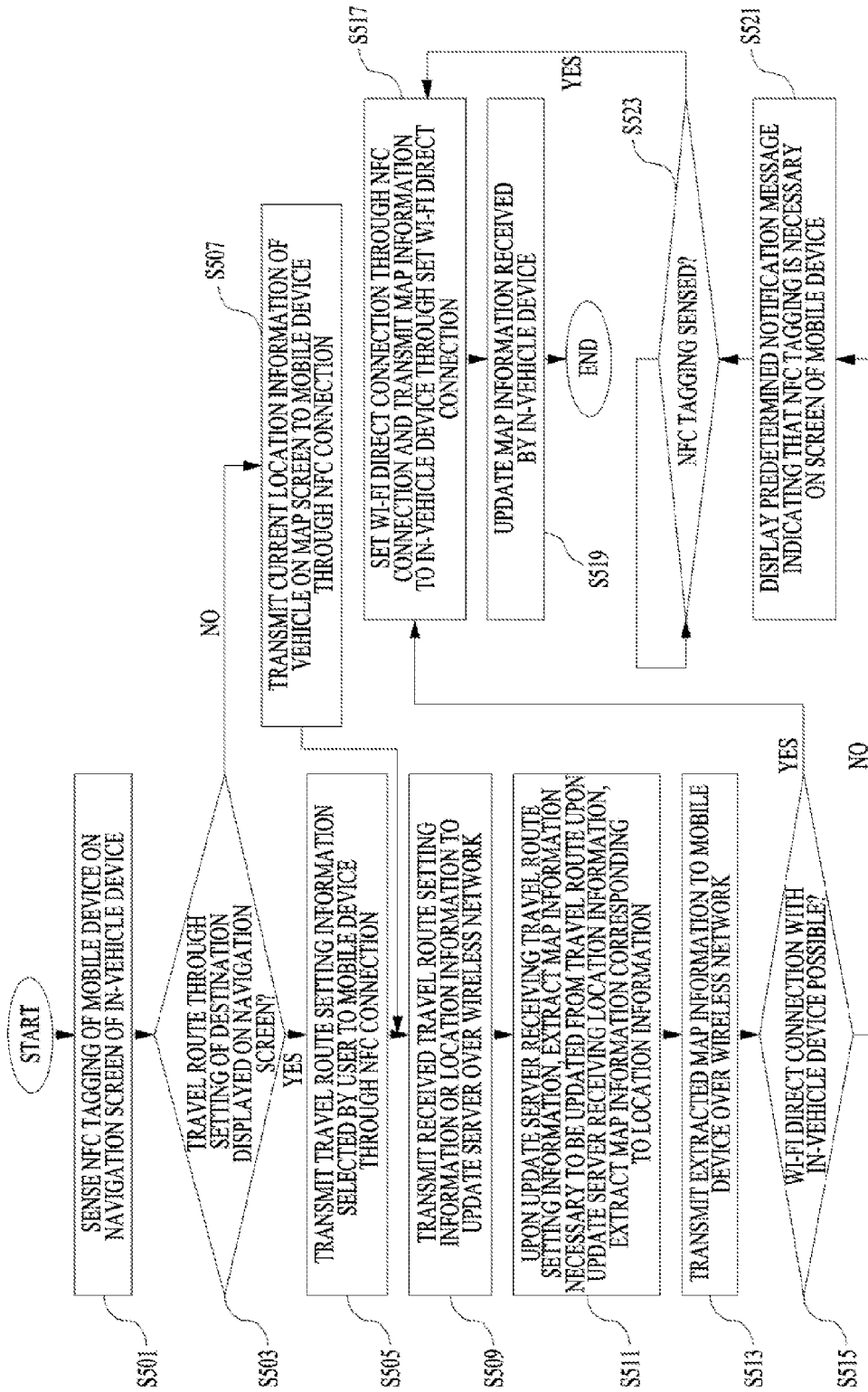

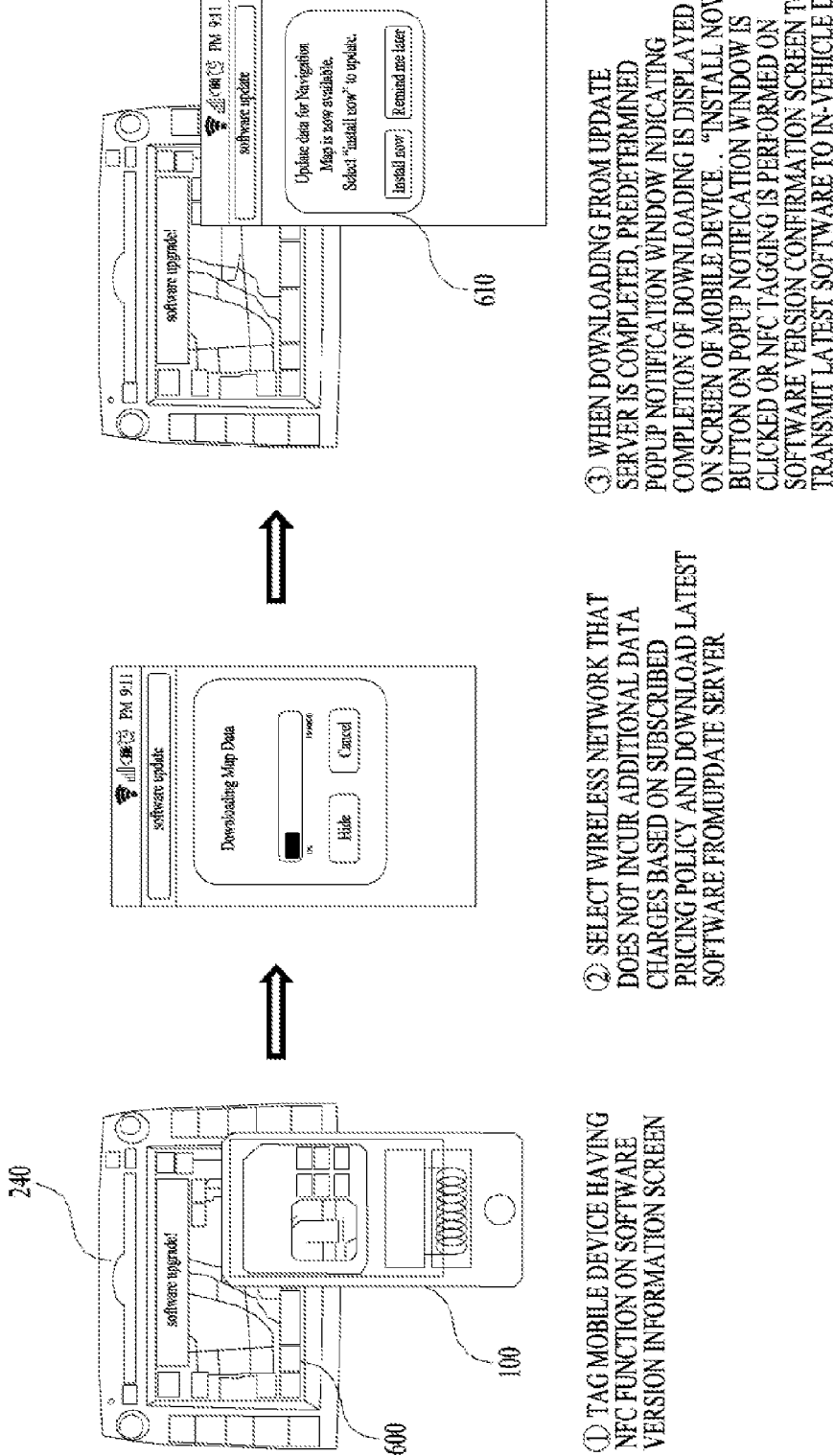

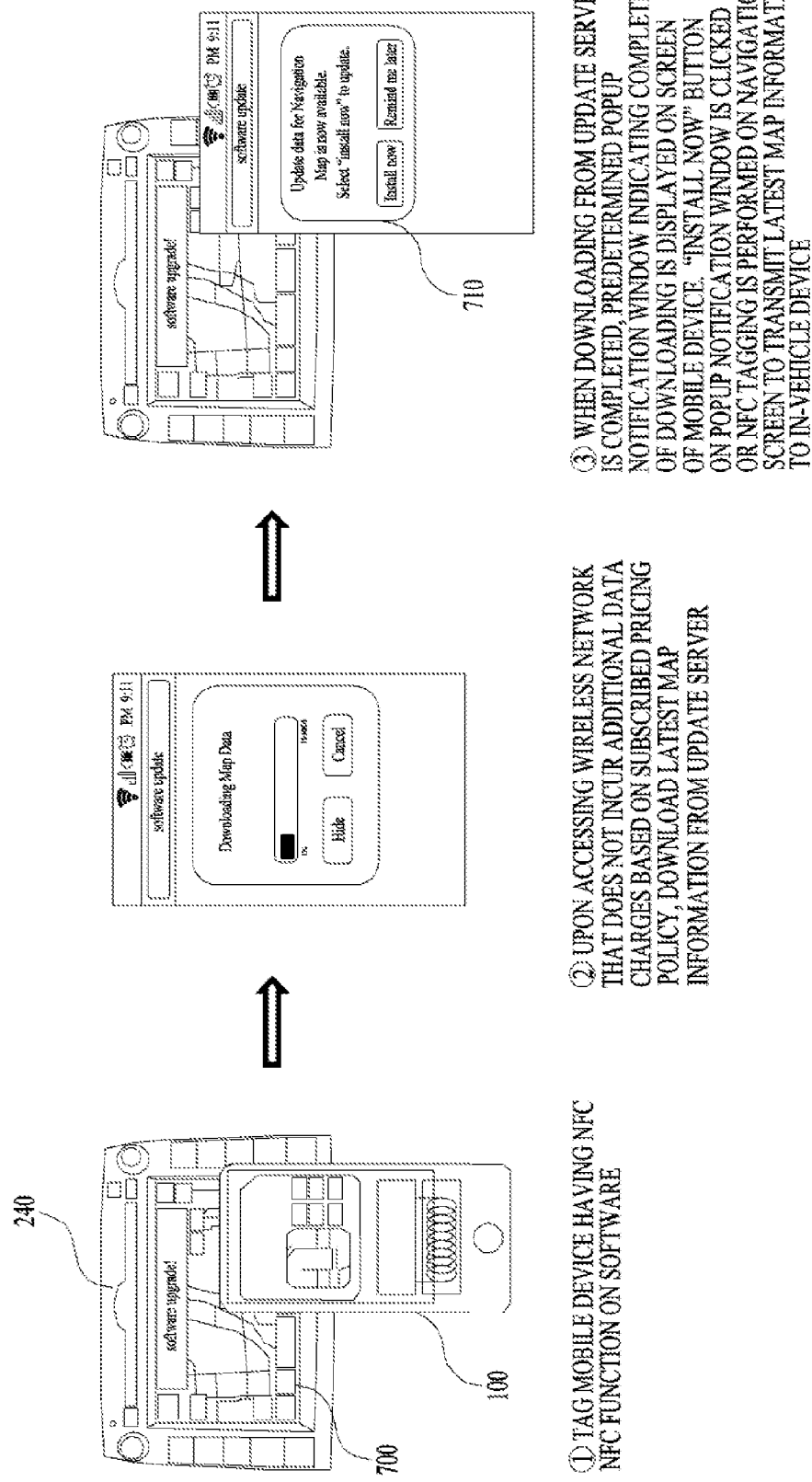

VEHICLE INFORMATION UPDATE METHOD AND APPARATUS

CROSS-REFERENCE TO RELATED APPLICATION

This application claims the benefit of and priority to Korean Patent Application No. 10-2013-0162186, filed on Dec. 24, 2013, which is hereby incorporated by reference as if fully set forth herein.

BACKGROUND

1. Technical Field

The present disclosure relates to a vehicle information update method, as well as an apparatus and system using the same, and, more particularly, to a method and apparatus for updating vehicle software and a navigation map using a mobile device having near field communication (NFC) functionality.

2. Discussion of the Related Art

With the progress of automobile technology, recent vehicles have developed various and increasingly complex functionality. In addition, various kinds of software to realize the various and complex functionality have also been provided. In particular, a software upgrade rate based on the addition of new functions and error correction has increased, which causes user convenience.

Generally, in order to upgrade vehicle software, a vehicle owner visits a service center. Alternatively, the vehicle owner may manually access an Internet-based home page related to the vehicle to check and download software corresponding to the type and manufacture year of the vehicle, and then install the downloaded software. For example, the vehicle owner stores the checked software in a portable storage medium, such as a universal serial bus (USB) memory or the like, connects the portable storage medium to the vehicle, and drives a predetermined application for software update to perform software upgrade. Generally, a version for vehicle software upgrade is provided once a quarter. However, the above manual process can be inconvenient for the vehicle owner.

In addition, map data for navigation is typically updated once a quarter. The entire map data is downloaded from a predetermined map server and stored in the vehicle. In particular, the map data has a large size of 4 gigabytes (GB) to 5 GB. According to types, large-sized data having a size of 10 GB or more exist, as well. For this reason, it may take long time to download map data from the Internet home page.

In recent years, different software systems have been equipped in vehicles, even in the same vehicle type. As a result, drivers often have difficulty in directly checking and finding software versions appropriate for their own vehicles.

SUMMARY

Accordingly, the present disclosure is directed to a vehicle information update method and apparatus that substantially obviate one or more problems due to limitations and disadvantages of the related art. An object of the present disclosure is to provide a vehicle information update method using a mobile device having near field communication (NFC) functionality. Another object of the present disclosure is to provide a map information update method of an in-vehicle navigation device using a mobile device having the NFC functionality. Another object of the present disclosure is to provide a map information update method of an in-vehicle navigation device that is capable of partially updating map information used in the in-vehicle navigation device. Another object of the present disclosure is to provide a method of more rapidly and effectively utilizing a wireless access means in receiving vehicle software navigation map information from a server. A further object of the present disclosure is to provide an apparatus, system, and recording medium implementing the above methods.

Additional advantages, objects, and features of the disclosure will be set forth in part in the detailed description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a vehicle information update method in a mobile device having near field communication (NFC) functionality includes: receiving software version information from an in-vehicle device through NFC tagging, transmitting a predetermined control message including the software version information to an update server using a first wireless access means, receiving latest software corresponding to the software version information from the update server using a second wireless access means, and transmitting the received latest software to the in-vehicle device using a third wireless access means in a vehicle.

The NFC tagging may be performed on a software version confirmation screen of the in-vehicle device.

The second wireless access means may include: i) a wireless Internet communication means supporting at least one wireless access technology selected from a group consisting of: Wi-Fi, Wibro, and Wimax and ii) a mobile communication means supporting at least one wireless access technology selected from a group consisting of: WCDMA, HSPA, LTE, and LTE-A.

The vehicle information update method may further include selecting the second wireless access means to be used to receive the latest software, wherein the second wireless access means may be selected based on at least one factor selected from a group consisting of: a wireless connection state, data communication expenses, and a data transmission speed per wireless access means.

The software version information may identify at least one item selected from a group consisting of: a software creation date, a type of an in-vehicle device to which the software is installed, and a type and a specification of a vehicle having the in-vehicle device equipped therein.

The third wireless access means may be connected to the in-vehicle device via a Wi-Fi Direct connection.

The vehicle information update method may further include displaying a predetermined notification message indicating that the NFC tagging is to be re-performed on a screen of the mobile device when the Wi-Fi Direct connection is not possible, wherein, when the NFC tagging is sensed by the in-vehicle device and the Wi-Fi Direct connection is established, the latest software may be transmitted through the established Wi-Fi Direct connection.

In another aspect of the present disclosure, a vehicle information update method in an in-vehicle device interlocked with a mobile device through NFC connection includes: sensing NFC tagging on a display screen of the in-vehicle device, transmitting first information including at least one item selected from a group consisting of: location information, travel route setting information, software version information, and map version information, according to a type of the display screen, to the mobile device through the NFC connection, and receiving latest software or latest map information corresponding to the first information from the mobile device through a first wireless access means in a vehicle.

The first wireless access means may be any one of: a NFC connection, a Bluetooth connection, and a Wi-Fi Direct connection.

The first wireless access means may be selected based on a data size of the latest software or a data size of the latest map information.

In another aspect of the present disclosure, a vehicle information update method in a mobile device having NFC functionality includes: receiving location information or travel route setting information of a vehicle from an in-vehicle device through NFC tagging, transmitting a predetermined control message including the location information or the travel route setting information to an update server over a wireless network, receiving latest map information corresponding to the location information or the travel route setting information from the update server over the wireless network, and transmitting the received latest map information to the in-vehicle device using an available wireless access means in the vehicle.

The location information or the travel route setting information may be received by the NFC tagging on a navigation screen of the in-vehicle device.

When the navigation screen is a screen to display a travel route based on an input of a destination, the travel route setting information may be received.

When the navigation screen is a screen to display only a current location of the vehicle, the location information may be received.

When the travel route setting information is received, the latest map information may be changed map information based on the travel route.

When the location information is received, the latest map information may be changed map information within a predetermined radius from a current location of the vehicle.

In another aspect of the present disclosure, a vehicle information update system using NFC includes: an update server to transmit latest vehicle software and latest map information over a wireless network according to an external request, an in-vehicle device having NFC functionality and being configured to sense NFC tagging through a display screen, the in-vehicle device transmitting first information including at least one item selected from a group consisting of: location information, travel route setting information, software version information, and map version information according to type of the display screen, through NFC connection, and a mobile device to transmit a predetermined control message including the first information to the update server over the wireless network upon receiving the first information from the in-vehicle device, to receive the latest software or the latest map information based on the first information over the wireless network, and to transmit the received latest software or the received latest map information to the in-vehicle device using a wireless access means in the vehicle.

The mobile device may select the wireless access means from a group consisting of: a Wi-Fi Direct connection, an NFC connection, and a Bluetooth connection, based on a size of the latest software or a size of the latest map information.

The wireless network may include: i) a wireless Internet network supporting at least one wireless access means selected from a group consisting of: Wi-Fi, Wibro, and Wimax and ii) a mobile communication network supporting at least one wireless access means selected from a group consisting of: WCDMA, HSPA, LTE, and LTE-A.

The mobile device may select the wireless access means based on at least one factor selected from a group consisting of: a wireless connection state, data communication expenses, and a data transmission speed per wireless access means.

In another aspect of the present disclosure, a mobile device includes: a means to receive software version information from an in-vehicle device through NFC tagging, a means to transmit a predetermined control message including the software version information to an update server using a first wireless access means, a means to receive latest software corresponding to the software version information from the update server using a second wireless access means, and a means to transmit the received latest software to the in-vehicle device using a third wireless access means in the vehicle.

In a further aspect of the present disclosure, a vehicle information update apparatus interlocked with a mobile device through an NFC connection includes: a means to sense NFC tagging on a display screen of the apparatus, a means to transmit first information including at least one item selected from a group consisting of: location information, travel route setting information, software version information, and map version information, according to a type of the display screen, to the mobile device through the NFC connection, and a means to receive latest software or latest map information corresponding to the first information from the mobile device through a first wireless access means in a vehicle.

The above technical solutions are merely some embodiments of the present disclosure, and various embodiments into which the technical features of the present invention are incorporated may be derived and understood by those skilled in the art from the detailed description of the present disclosure which follows.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 4 is a flowchart illustrating a vehicle software update procedure according to embodiments of the present disclosure;

FIG. 5 is a flowchart illustrating a map information update method using near field communication (NFC) according to embodiments of the present disclosure;

FIG. 6 is a view illustrating a vehicle software update procedure according to embodiments of the present disclosure; and FIG. 7 is a view illustrating a map information update procedure of an in-vehicle navigation device according to embodiments of the present disclosure.

DETAILED DESCRIPTION OF THE EMBODIMENTS

Figure 1:
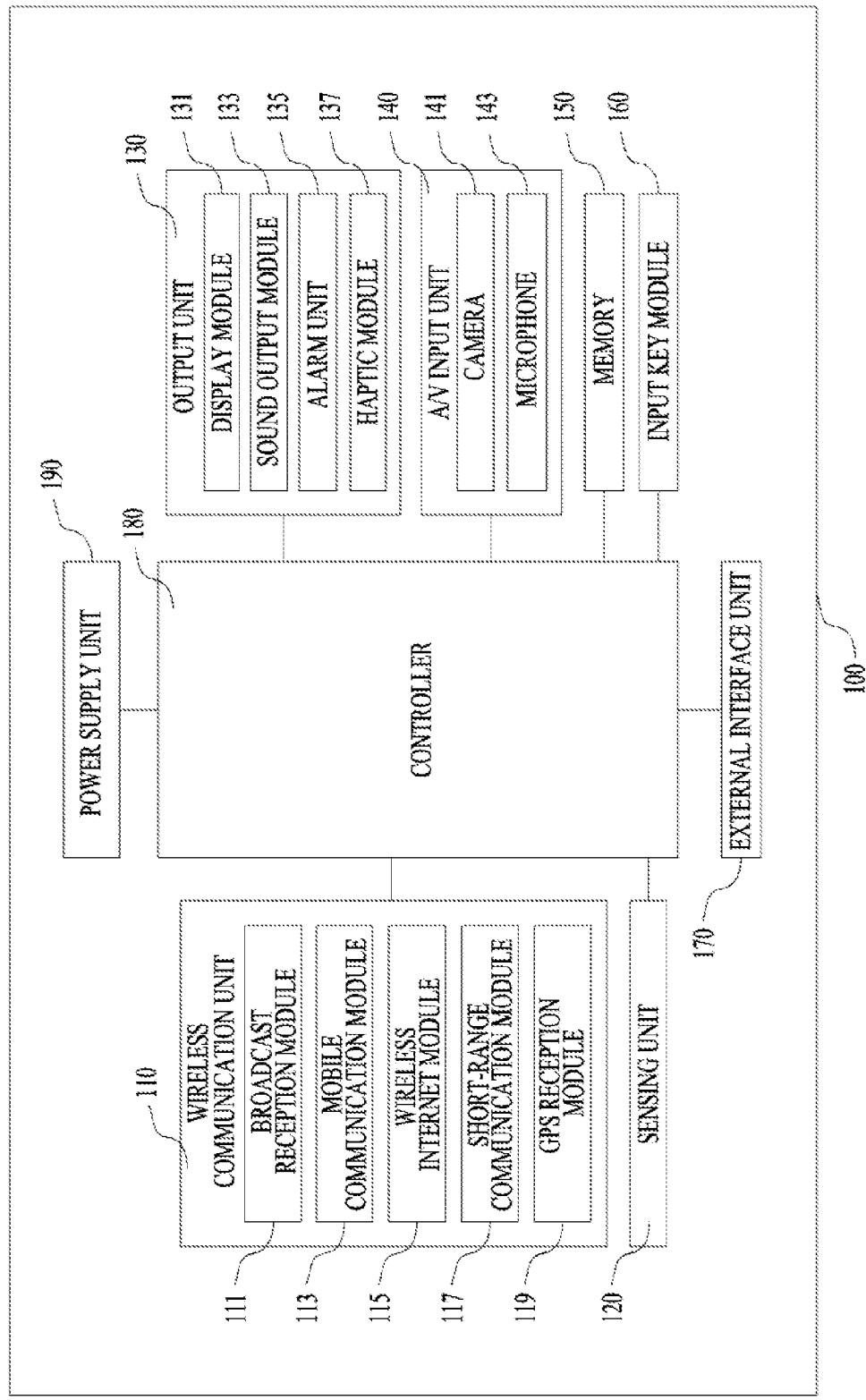
FIG. 1 is a view showing configuration of a mobile device according to embodiments of the present disclosure.

Reference will now be made in detail to the embodiments of the present disclosure, examples of which are illustrated in the accompanying drawings. The suffixes "module" and "unit" of elements herein are used for convenience of description and thus can be used interchangeably and do not have any distinguishable meanings or functions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As a mobile device described herein, a mobile phone, a smartphone, a laptop computer, a digital broadcast receiver, a personal digital assistant (PDA), a portable multimedia player (PMP), etc. may be used. However, it should be noted that configuration according to embodiments disclosed in this specification is applicable to a fixed terminal, such as a desktop computer, as well as a mobile terminal.

An in-vehicle device described herein is a device that provides at least one selected from among an audio/video reproduction function, a navigation function, a broadcast reception function, a global positioning system (GPS) reception function, an in-vehicle wireless communication function, and the like. It should be noted that the in-vehicle device may have different functions and configurations based on vehicle type and vehicle option.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory may be configured to store program instructions, and the processor may be configured to execute the program instructions to perform one or more processes which are described further below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring to FIG. 1, a mobile device 100 may include a wireless communication unit 110, a sensing unit 120, an output unit 130, an audio/video (A/V) input unit 140, a memory 150, an input key module 160, an external interface unit 170, a controller 180, and a power supply unit 190. The components of the mobile device 100 shown in FIG. 1 are not requisite and, therefore, a mobile device having greater or fewer components may be implemented. Hereinafter, the components of the mobile device 100 will be described in detail.

The wireless communication unit 110 typically includes one or more components which enables wireless communication between the mobile device 100 and a wireless communication system or between the mobile device 100 and an in-vehicle communication device. For example, the wireless communication unit 110 may include a broadcast reception module 111, a mobile communication module 113, a wireless Internet module 115, a short-range communication module 117, and a GPS reception module 119.

The broadcast receiving module 111 receives a broadcast signal and/or broadcast associated information from an external broadcast management server via a broadcast channel. The broadcast channel may include a satellite channel and a terrestrial channel. The broadcast management server may refer to a server which generates and transmits a broadcast signal and/or broadcast associated information or a server which receives a previously generated broadcast signal and/or broadcast associated information and then transmits the received signal or information to the mobile device 100. The broadcast signal may include a TV broadcast signal, a radio broadcast signal, and a data broadcast signal, among others. In addition, the broadcast signal may further include a broadcast signal as a combination of a TV or radio broadcast signal and a data broadcast signal The broadcast associated information may refer to information associated with a broadcast channel, a broadcast program, or a broadcast service provider. The broadcast associated information may be provided via a mobile communication network. In this case, the broadcast associated information may be received by the mobile communication module 113.

The broadcast associated information may be provided in various forms. For example, an electronic program guide (EPG) of digital multimedia broadcasting (DMB) or an electronic service guide (ESG) of digital video broadcast-handheld (DVB-H) may be included in the broadcast associated information.

The broadcast reception module 111 may receive broadcast signals using various broadcast systems. In particular, the broadcast reception module 111 may receive broadcast signals using digital broadcasting systems, such as digital multimedia broadcasting-terrestrial (DMB-T), digital multimedia broadcasting-satellite (DMB-S), media forward link only (MediaFLO), digital video broadcast-handheld (DVB-H), and integrated services digital broadcast-terrestrial (ISDB-T). Of course, the broadcast reception module 111 may be configured as suitable for other broadcasting systems that provide broadcast signals, as well as the above-described digital broadcasting systems.

The broadcast signal and/or broadcast associated information received by the broadcast reception module 111 may be stored in the memory 150. In addition, the broadcast information received by the broadcast reception module 111 may be transmitted to a specific in-vehicle device, such as an in-vehicle navigation device, through a predetermined short-range communication means.

The mobile communication module 113 transmits/receives wireless signals to/from a base station, a relay, a repeater, a femtocell, etc. through a wireless interface of the mobile communication network. The wireless signals may include, for example, speech and video communication signals or various data signals based on text/multimedia message transmission and reception.

The mobile device 100 according to embodiments of the present disclosure may download software for in-vehicle devices and transmit the downloaded software to the in-vehicle devices through the mobile communication module 113. Particularly, in a case in which a pricing policy for the mobile device 100 includes unrestricted data, the mobile device 100 may use the mobile communication module 113 to update vehicle software directly. The mobile communication module 113 may support at least one mobile communication standard selected from among Wideband Code Division Multiple Access (WCDMA), High Speed Packet Access (HSPA), Long Term Evolution (LTE)/LTE Advanced, and the like.

The wireless Internet module 115 may refer to a transmission/reception module for wireless Internet access. The wireless Internet module 115 may be mounted in the mobile device 100 or externally connected to the mobile device 100 through a predetermined interface terminal. Wireless LAN (WLAN) (Wi-Fi), Wireless broadband (Wibro), World Interoperability for Microwave Access (Wimax), etc. may be used as wireless Internet technology.

The mobile device 100 according to embodiments of the present disclosure may access a predetermined vehicle software update server or a predetermined map information provision server through the wireless Internet module 115 to receive necessary software by downloading or to receive map information updated in real time. The received map information may be map information corresponding to a travel route set in the in-vehicle navigation device and may be updated on the travel route in real time. The map information may include a map image, voice-based travel route guidance information, and real-time traffic guidance information.

In the above example, the vehicle software update server and the map information provision server are described as being separate servers. However, it should be noted that the vehicle software update server and the map information provision server may be realized as one server. Hereinafter, the above two servers will be commonly referred to as an "update server" for the convenience of description.

The short-range communication module 117 is a module for short-range communication. Short-range communication technology may include at least one selected from among near field communication (NFC), Bluetooth, radio frequency identification (RFID), infrared data association (IrDA), ultra-wideband (UWB), ZigBee, and the like.

Generally, NFC is technology to transmit data between devices within a short distance of less than 10 cm. That is, NFC is short-range wireless communication technology. Since transmission and reception of data are possible in NFC, the mobile device 100 according to embodiments of the present disclosure may transmit/receive data to/from the in-vehicle device through NFC connection.

The mobile device 100 according to embodiments of the present disclosure may communicate with a predetermined in-vehicle device, such as an in-vehicle navigation device or an audio/video device, through NFC connection and acquire software version information from the in-vehicle device. The software version information may be configured to identify at least one selected from among software creation date, type of the in-vehicle device to which the software is installed, type and specification of a corresponding vehicle, and the like. The specification information may include manufacture year information and option information of the vehicle.

In the above example, the software version information is described as including various kinds of information. In the alternative, the in-vehicle device may individually transmit various kinds of information included in the software version information to the mobile device 100.

In addition, the mobile device 100 may receive current location information of the vehicle and travel route setting information from the in-vehicle device, such as an in-vehicle navigation device, through NFC connection. The mobile device 100 may transmit the received location information and travel route setting information to the update server through the wireless Internet module 115 or the mobile communication module 113. At this time, the update server may extract map information corresponding to the received location information and travel route setting information and transmit the extracted map information to the mobile device 100 via the wireless communication network.

The mobile device 100 may decide a communication means which will be used to communicate with the update server, i.e., a wireless access means, considering at least one selected from among a wireless connection state, data communication expenses, data transmission speed, and the like. The wireless access means may include a wireless Internet communication means supporting at least one selected from among Wi-Fi, Wibro, Wimax, and the like, which are wireless access technologies, and a mobile communication means supporting at least one selected from among WCDMA, HSPA, LTE, LTE-A, and the like, which are also wireless access technologies. For example, in a case in which Wi-Fi and LTE communication is possible in the current wireless connection state, and a pricing policy for an LTE service does not include unrestricted data, the mobile device 100 may communicate with the update server using a Wi-Fi communication means. On the other hand, in a case in which Wi-Fi and LTE communication is possible in the current wireless connection state, and a pricing policy for an LTE service does include unrestricted data, the mobile device 100 may communicate with the update server using an LTE communication means.

The GPS reception module 119 is a module that confirms or acquires location information of the mobile device 100 using a signal received through a positioning satellite. The in-vehicle navigation device may include an additional GPS reception module and acquire current location information of the vehicle using the additional GPS reception module.

The sensing unit 120 may sense change in an internal or external state of the mobile device 100 according to a control signal of the controller 180 and create sensing information based thereupon. The sensing information created by the sensing unit 120 may include information necessary to sense an internal/external state of the mobile device 100 and to control operation of the mobile device 100, e.g., information regarding an open/close state of the mobile device 100, location of the mobile device 100, user's contact or noncontact with the mobile device 100, orientation or altitude of the mobile device 100, rotation and movement of the mobile device 100, speed/acceleration/deceleration of the mobile device 100, external temperature/humidity/luminosity of mobile device 100, a connection or disconnection state of a peripheral device, such as connection or disconnection of an earphone, ambient sound, and connection with an external communication device.

For example, the mobile device 100 may identify an in-vehicle device capable of performing NFC communication through the sensing unit 120 and commence an NFC communication connection, such as an NFC point-to-point (P2P) connection, with the in-vehicle device according to a user input. The NFC P2P connection is one of inter-device information sharing means having an NFC function equipped therein. Specifically, the NFC P2P connection is an inter-device communication method used to update map information and vehicle software according to the present disclosure as well as content, such as pictures, music files, and the like.

The output unit 130 generates an output relevant to a sense of sight, hearing, or touch. The output unit 130 may include a display module 131, a sound output module 133, an alarm unit 135, and a haptic module 137.

The display module 131 displays (e.g., outputs) information processed by the mobile device 100. For example, in a case in which the mobile device 100 is in a telephone conversation mode, the display module 131 displays a user interface (UI) or graphical user interface (GUI) related to telephone conversation. On the other hand, in a case in which the mobile device 100 is in a video conversation mode or in a photographing mode, the display module 131 displays a photographed and/or received image, the UI, or the GUI. In particular, the display module 131 according to embodiments of the present disclosure may receive and display travel route information selected by a user (hereinafter be referred to as "travel route setting information") on the in-vehicle navigation device as an image through NFC tagging and display a downloaded state of map information received from the update server in response to the corresponding travel route information.

The display module 131 may include at least one selected from among a liquid crystal display, a thin film transistor-liquid crystal display, an organic light-emitting diode, a flexible display, a three-dimensional (3D) display, and the like. In a case in which the display module 131 and a sensor to sense a touch (hereinafter, referred to as a "touch sensor") constitute a mutual layer structure (hereinafter, simply referred to as a "touchscreen"), the display module 131 may be used as an input device in addition to an output device. The touch sensor may be configured as a touch film, a touch sheet, a touchpad, or the like. The touch sensor may be configured to convert pressure applied to a specific portion of the display module 131 or change of capacitance generated from a specific portion of the display module 131 to an electric input signal. The touch sensor may be configured to sense pressure of a touch as well as a touched position or area.

When a touch input is made to the touch sensor, a signal(s) corresponding to the touch is transmitted to a touch controller. The touch controller processes the signal(s) and then transmits data corresponding to the processed signal(s) to the controller 180. Therefore, the controller 180 may recognize which portion of the display module 131 has been touched.

The sound output module 133 may output audio data received from the wireless communication unit 110 or stored in the memory 150 in a call signal reception mode, a telephone conversation mode, a recording mode, a speech recognition mode, or a broadcast reception mode. The sound output module 133 outputs a sound signal related to a function (e.g., a call signal reception sound, a message reception sound, etc.) performed by the mobile device 100. The sound output module 133 may include a receiver, a speaker, a buzzer, and the like. In addition, the sound output module 133 may output sound through an earphone jack provided at one side of the mobile device 100.

The alarm module 135 outputs signals to notify that events have been generated in the mobile device 100. Examples of events generated in the mobile device 100 may include a near field communication (NFC) tag sensing event, a software download completion event, a map information update completion event, a reception event of location information or travel route setting information through NFC connection, a call signal reception event, a message reception event, a key signal input event, a touch input event, and the like. The alarm module 135 may output other different signals, such as vibration signals to notify of event generation, in addition to video signals or audio signals. The video signals or the audio signals may also be output through the display module 131 or the sound output module 133.

The haptic module 137 generates various tactile effects that a user can feel. A representative example of the tactile effects generated by the haptic module 137 is vibration. It is possible to set intensity and patterns of vibration generated by the haptic module 137 thorough a predetermined user interface. For example, the haptic module 137 may output different kinds of vibration in a synthesized state or sequentially output different kinds of vibration Referring to FIG. 1, the A/V input unit 140 is provided to input audio signals or video signals. The A/V input unit 140 may include a camera 141 and a microphone 143. The camera 141 processes image frames, such as still images or moving images, acquired by an image sensor in a video conversation mode or in a photographing mode. The processed image frames may be displayed on the display module 131. The image frames processed by the camera 141 may be stored in the memory 150 or transmitted to an external device via the wireless communication unit 110. According to the configuration of the terminal, two or more cameras 141 may be provided.

The microphone 143 receives external sound signals and converts the received sound signals into electrical speech data in a telephone conversation mode, a recording mode, or a speech recognition mode. In the telephone conversation mode, the converted speech data may be converted and output into a form transmittable to a mobile communication base station through the mobile communication module 113. Various noise removal algorithms to remove noise generated during input of external sound signals into the microphone 143 may be incorporated in the microphone 143.

The memory 150 may store programs necessary to operate the controller 180 and, in addition, temporarily store input/output data (e.g., map information, vehicle firmware, address books, messages, still images, moving images, application programs, etc.). The application programs may include maps, games, chatting, web surfing schedules, finance, dictionaries, and the like. The memory 150 may include at least one selected from among a flash memory type memory, a hard disk type memory, a multimedia card micro type memory, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like.

The input key module 160 allows a user to input commands to control operation of the mobile device 100. The input key module 160 may include a key pad, a dome switch, a touch pad (e.g., static pressure/electrostatic), a jog wheel, a jog switch, and the like.

The external interface unit 170 provides an interface to all external devices connected to the mobile device 100. Through the external interface unit 170, data from the external devices are received by the mobile device 100, power is supplied to the respective components of the mobile device 100, or data are transmitted from the mobile device 100 to the external devices. For example, a wired/wireless headset port, an external charger port, a wired/wireless data port, a memory card port, a port to connect a device having an identification module, an audio input/output (I/O) port, a video I/O port, an earphone port, and the like, may be included in the mobile device 100.

The controller 180 generally controls overall operation of the mobile device 100. For example, the controller 180 may control a communication function including speech communication, data communication, and video communication. In addition, the controller 180 may control a vehicle software update procedure according to the present disclosure and a map information update procedure of an in-vehicle navigation device according to the present disclosure.

In particular, the controller may control input and output according to various control signals from the low-level modules and configure and provide a user interface screen based thereon. The low-level modules may include the wireless communication unit 110, the sensing unit 120, the output unit 130, the A/V input unit 140, the memory 150, the input key module 160, the external interface unit 170, and the power supply unit 190. The power supply unit 190 supplies external power or internal power to the respective components of the mobile device 100 under control of the controller 180.

Various embodiments described herein may be realized in recording media, which can be read by a computer or a device similar thereto, for example, using software, hardware, or a combination thereof. In a hardware type realization, embodiments described herein may be realized using at least one selected from among application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electric units to perform other functions, and the like. The embodiments may be realized using the controller 180.

In a software type realization, embodiments such as procedures and functions described herein may be realized with additional software modules to perform at least one function or operation. Software code may be realized using a software application written using an appropriate programming language. In addition, the software code may be stored in the memory 150 and may be executed by the controller 180.

Vehicle software described herein may include various kinds of application software as well as firmware basically or essentially required to operate an in-vehicle device. The application software may include various kinds of software, such as maps, weather, traffic, games, finance, chatting, schedules, and the like.

Figure 2:
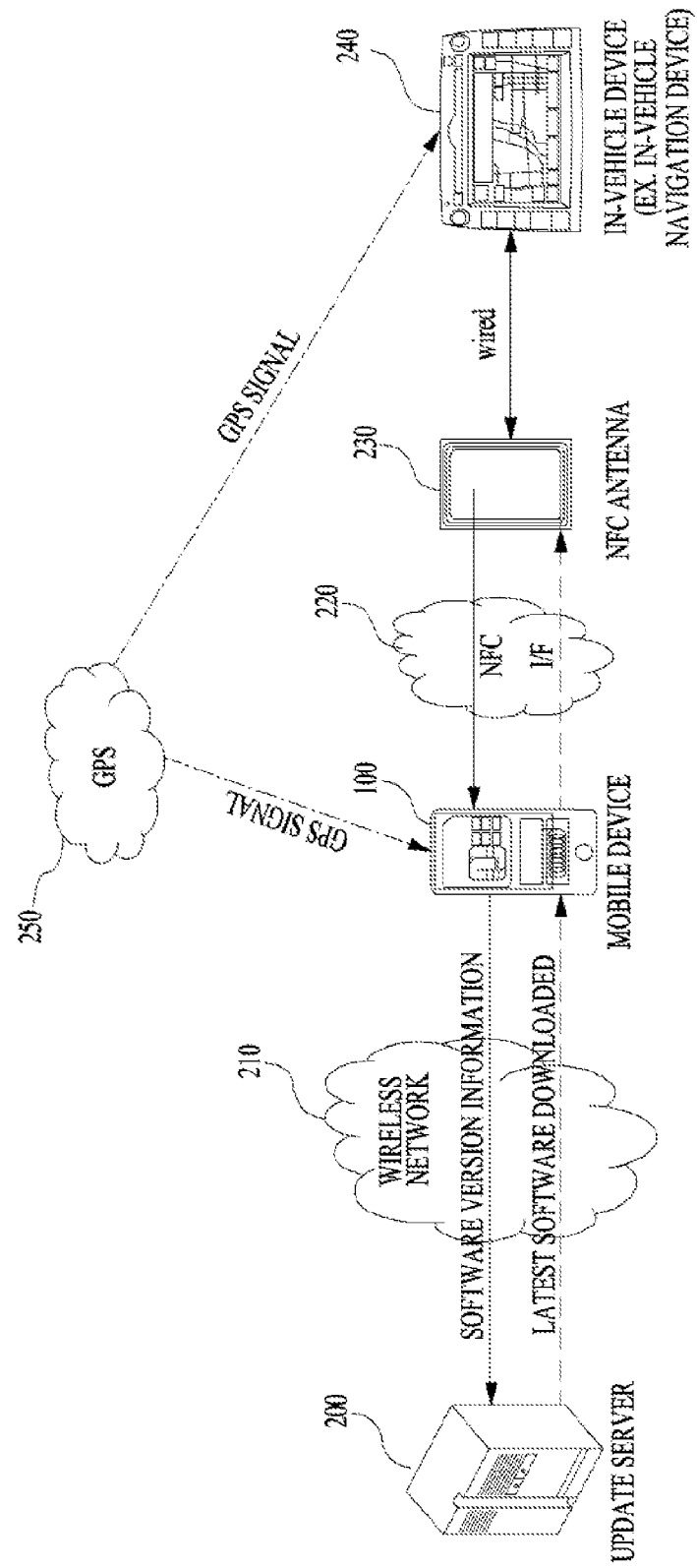
FIG. 2 is a view showing configuration of a system to support a vehicle software upgrade method according to embodiments of the present disclosure.

FIG. 2 is a view showing configuration of a vehicle software upgrade system according to embodiments of the present disclosure.

As shown in FIG. 2, the system according to the present disclosure includes a mobile device 100 having NFC functionality, an update server 200 to provide vehicle software and map information over a wireless network 210, an NFC antenna 230 attached to one side in a vehicle to transmit and receive data through an NFC interface 220 between the mobile device 100 and an in-vehicle device 240, the in-vehicle device 240 connected to the NFC antenna 230 in a wired fashion, the in-vehicle device 240 being mounted in a vehicle, and a GPS 250 to transmit a GPS signal necessary for positioning to the mobile device 100 and the in-vehicle device 240.

The mobile device 100 has an NFC controller and an NFC antenna built therein. The mobile device 100 may acquire current software version information and vehicle type information from the in-vehicle device 240 through NFC tagging. The NFC tagging may be performed by tagging the mobile device 100 on a screen of the in-vehicle device 240 or a software version information screen provided by the in-vehicle device 240.

Subsequently, the mobile device 100 transmits a predetermined control message, such as a software update request message, including software version information and vehicle type information to the update server 200 over the wireless network. The update server 200 determines whether the received software version is the latest version of the vehicle. Upon determining that the received software version is not the latest version, the update server 200 transmits the latest software of the vehicle to the mobile device 100 over the wireless network 210. The wireless network 210 may be any one selected from among various wireless access means, such as a Wi-Fi network, a WCDMA network, an LTE network, an LTE-A network, and the like.

When there is no updatable latest version, i.e., the software currently installed in the vehicle is the latest version, the update server 200 may transmit a predetermined notification message indicating that there is not updatable software to the mobile device 100. Subsequently, the mobile device 100 may transmit the notification message to the in-vehicle device 240 through an NFC connection. The mobile device 100 according to embodiments of the present disclosure may decide an optimal wireless access means considering connection state information, a subscribed data pricing policy, and the like, per wireless access means.

The mobile device 100 transmits the received latest software to the in-vehicle device 240 through the NFC interface 220. The received latest software is installed in the in-vehicle device 240. In another example, the mobile device 100 may transmit the received latest software to the in-vehicle device 240 through a Wi-Fi Direct connection in the vehicle. In a further example, the mobile device 100 may transmit the received latest software to the in-vehicle device 240 through a Bluetooth connection in the vehicle.

The mobile device 100 may select any one from among available in-vehicle wireless access means which will be used to transmit the latest software based on data size of the received latest software. The available in-vehicle wireless access means may include an NFC connection, a Wi-Fi Direct connection, a Bluetooth connection, and the like. That is, the mobile device 100 may adaptably decide the wireless access means based on data size of the received latest software.

Hereinafter, a map information update procedure of the in-vehicle navigation device will be described in detail with reference to FIG. 2.

Referring to FIG. 2, the mobile device 100 receives current location information of the vehicle from the in-vehicle device 240 through the NFC interface 220. The mobile device 100 transmits the received location information to the update server 220 over the wireless network 210. Subsequently, the update server 220 transmits latest map information corresponding to the location information to the mobile device 100 over the wireless network 210. The latest map information may be map information within a predetermined radius having the received location information as a reference point. For example, the latest map information may be map information within 50 meters from the current location of the vehicle.

The mobile device 100 transmits the latest map information to the in-vehicle device 240 through the NFC interface

220. Subsequently, the in-vehicle device 240 displays the received latest map information on a screen.

In the above embodiments, the in-vehicle device 240 is described as transmitting only the location information to the mobile device 100. Alternatively, however, the in-vehicle device 240 may also transmit version information of the map installed in the in-vehicle device 240 to the mobile device 100. Upon receiving the map version information and the location information, therefore, the update server 200 first determines whether the received map version is the latest version. Upon determining that the received map version is not the latest version, the update server 200 may extract latest map information corresponding to the received location information and transmit the extracted latest map information to the mobile device 100.

In embodiments of the present disclosure, the mobile device 100 may alternatively acquire travel route setting information selected by a driver and map version information from the in-vehicle device 240 through the NFC interface 220. Subsequently, upon receiving the travel route setting information and the map version information over the wireless network 210, the update server 200 determines whether the received map version is the latest version. Upon determining that the received map version is not the latest version, the update server 200 may extract updated map information on the travel route and transmit the extracted map information to the mobile device 100.

At this time, the update server 200 may transmit only map information corresponding to a corresponding location considering the change of the location due to travel of the vehicle instead of transmitting the updated map information on the travel route at once. Furthermore, the mobile device 100 may adaptably change a period to receive location information from the in-vehicle device 240 based on the travel speed of the vehicle. In embodiments of the present disclosure, the mobile device 100 may alternatively acquire current location information of the vehicle through the GPS reception module 119 equipped therein without receiving location information from the in-vehicle device 240.

In the above description, the mobile device 100 transmits the latest software and map information received from the update server 200 to the in-vehicle device 240 through the NFC interface 220. Alternatively, the mobile device 100 may perform pairing of the Wi-Fi Direct communication means or the Bluetooth communication means equipped in the vehicle between the mobile device 100 and the in-vehicle device 240 through NFC tagging and may transmit upgraded latest software and map information to the in-vehicle device 240 using the paired communication means.

Figure 3:
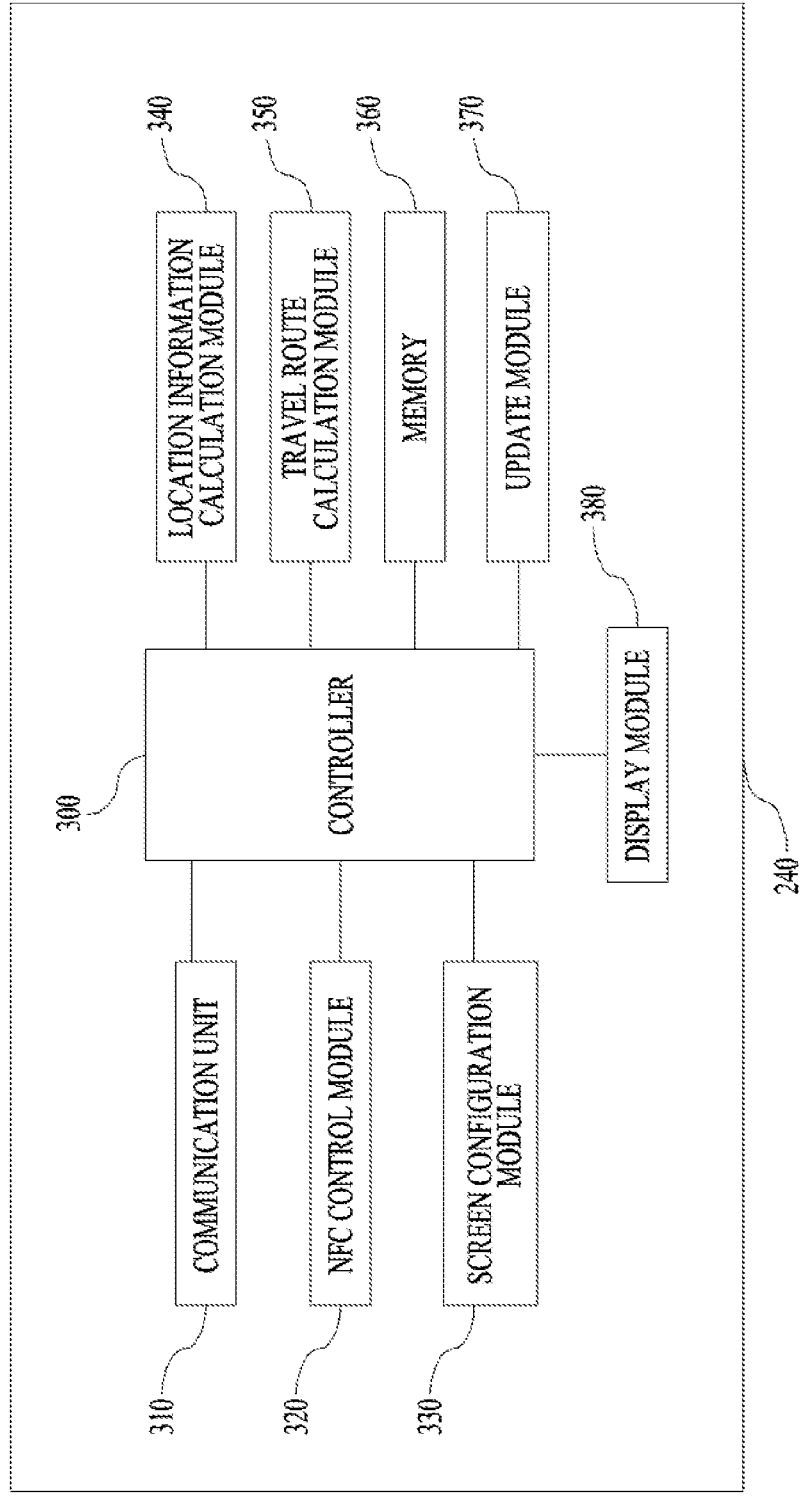
FIG. 3 is a view showing internal configuration of an in-vehicle device according to embodiments of the present disclosure.

FIG. 3 is a view showing internal configuration of an in-vehicle device according to embodiments of the present disclosure.

Referring to FIG. 3, the in-vehicle device 240 may include a controller 300, a communication unit 310, an NFC control module 320, a screen configuration module 330, a location information calculation module 340, a travel route calculation module 350, a memory 360, an update module 370, and a display module 380.

The controller 300 performs a function to control overall input/output in the in-vehicle device 240 and operation of the low-level modules. Detailed operation of the controller 300 will be more apparent from the following description of the low-level modules.

The communication unit 310 is a module that provides a wired and wireless communication means to an external device. The communication unit 310 may include at least one selected from among an NFC module, a Wi-Fi module, a GPS reception module, a Bluetooth module, and the like.

The NFC control module 320 is a module that controls an NFC connection. The NFC control module 320 senses NFC tagging of an external device, such as the mobile device 100, to commence NFC connection or performs an operation to pair the NFC connection to another communication means.

For example, the NFC control module 320 may control the NFC connection to be used for relatively small data, such as location information, travel route setting information, software version information, and the like, and may control P2P communication to be performed through a communication means, such as Wi-Fi, Bluetooth, or the like, in a case in which it is necessary to receive large-sized data, such as updated latest software and map information, from the mobile device 100. In addition, when sensing tagging of the mobile device 100 on a specific screen provided by the in-vehicle device 240, the NFC control module 320 may control specific information corresponding to the screen to be transmitted to the mobile device 100.

In an example, when tagging of the mobile device 100 is sensed on a software version information screen, the NFC control module 320 may control currently installed software version information to be transmitted to the mobile device 100. In another example, when tagging of the mobile device 100 is sensed on a map screen, the NFC control module 320 may control current location information of the vehicle and travel route setting information to be transmitted to the mobile device 100.

The screen configuration module 330 is a module that configures a user interface screen to be transmitted to the display module 380 according to a control signal of the controller 300.

The location information calculation module 340 is a module that decodes a GPS signal received by the GPS reception module to calculate current location information of the vehicle. The location information may be any one selected from latitude and longitude information, address information, coordinates information on the map, and the like.

The travel route calculation module 350 calculates a travel route to a destination input by a driver. The travel routes may include the shortest route, a recommended route, a free route, and the like. The user may select any one of the routes using a predetermined input means, e.g., by a touch input.

The memory 360 may store currently installed software files, software version information, downloaded latest software information, the latest software version information, entire map information, currently stored map version information, travel route selection information, and the like. In addition, the memory 360 may store information necessary to configure a user interface screen.

The update module 370 updates the latest software and map information downloaded from the mobile device 100 according to a control signal of the controller 300. An update request may be received from the mobile device 100. To this end, when downloading to the in-vehicle device 240 is completed, the mobile device 100 may display a predetermined popup message indicating completion of downloading on a screen and transmit a predetermined update request message to the in-vehicle device 240 according to a user input on the displayed popup.

In embodiments of the present disclosure, when the latest software or map information is downloaded from the mobile device 100, the in-vehicle device 240 may alternatively display a predetermined popup message asking whether update is needed through the display module 370 and commence a software installation procedure or a map information update procedure according to a user input.

FIG. 4 is a flowchart illustrating a vehicle software update procedure according to embodiments of the present disclosure.

Referring to FIG. 4, when NFC tagging is sensed on the software version confirmation screen of the in-vehicle device 240 (S401), the mobile device 100 receives currently installed software version information and vehicle type information from the in-vehicle device 240 through NFC connection (S403). The mobile device 100 transmits the received software version information and vehicle type information to the update server 200 over the wireless network (S405). The update server 200 determines whether an updatable software version is present based on the received software version information and vehicle type information (S407).

Upon determining that updatable software version is present, the update server 200 transmits a predetermined notification message notifying that updatable software version is present to the mobile device 100 (S409). Alternatively, upon determining that an updatable software version is not present at step S407, the update server 200 may transmit a predetermined notification message notifying that an updatable software version is not present to the mobile device 100 (S417).

Subsequently, the mobile device 100 selects a wireless access means which will be used to download software (S411). A wireless access means that incurs the lowest charges may be first selected from among available wireless access means. In a case in which a plurality of wireless access means that do not incur several types of charges is present, a wireless access means supporting the highest transfer speed may be selected.

The mobile device 100 receives the latest software from the update server 200 through the selected wireless access means and stores the received latest software in a predetermined recording region (S413). When reception of the latest software is completed, the mobile device 100 determines whether Wi-Fi Direct connection with the in-vehicle device 240 is possible (S415).

Upon determining that Wi-Fi Direct connection with the in-vehicle device 240 is possible, the mobile device 100 sets Wi-Fi Direct connection through NFC connection and transmits the received latest software to the in-vehicle device 240 through the set Wi-Fi Direct connection (S419). When reception of the latest software is completed, the latest software is installed in the in-vehicle device 240 (S421). Alternatively, upon determining that a Wi-Fi Direct connection with the in-vehicle device 240 is not possible at step S415, the mobile device 100 may display a predetermined notification message indicating that the mobile device 100 must be NFC tagged on the software version confirmation screen of the in-vehicle device 240 by a user on a screen (S423). Subsequently, when NFC tagging is sensed by the in-vehicle device 240 (S425), the mobile device 100 performs step S419.

FIG. 5 is a flowchart illustrating a map information update method using NFC according to embodiments of the present disclosure. Specifically, FIG. 5 is a flowchart illustrating a method of partially updating map information of the in-vehicle navigation device using an NFC connection.

Referring to FIG. 5, when NFC tagging of the mobile device 100 is sensed on the navigation screen of the in-vehicle device 240 (S501), the in-vehicle device 240 determines whether a travel route selected according to user setting of a destination is displayed on the navigation screen (S503).

Upon determining that the travel route is displayed on the navigation screen, the in-vehicle device 240 transmits travel route setting information selected by the user to the mobile device 100 through NFC connection (S505). Alternatively, upon determining that the travel route is not displayed on the navigation screen at step S503, i.e., map information is displayed on the navigation screen simply based on current location of the vehicle, the in-vehicle device 240 transmits current location information of the vehicle on the map screen to the mobile device 100 through NFC connection (S507). The mobile device 100 transmits the received travel route setting information or location information to the update server 200 over the wireless network (S509).

Upon receiving the travel route setting information, the update server 200 extracts map information necessary to be updated from the travel route and, upon receiving the location information, the update server 200 extracts map information corresponding to the location information (S511). The update server 200 transmits the extracted map information to the mobile device 100 over the wireless network (S513).

When reception of the map information is completed, the mobile device 100 determines whether Wi-Fi Direct connection with the in-vehicle device 240 is possible (S515). Upon determining that Wi-Fi Direct connection with the in-vehicle device 240 is possible, the mobile device 100 sets Wi-Fi Direct connection through NFC connection and transmits the received map information to the in-vehicle device 240 through the set Wi-Fi Direct connection (S517).

When reception of the map information is completed, the in-vehicle device 240 performs a procedure of updating the map information (S519). Upon determining that Wi-Fi Direct connection with the in-vehicle device 240 is not possible at step S515, the mobile device 100 may display a predetermined notification message indicating that the mobile device 100 must be NFC tagged on the navigation screen of the in-vehicle device 240 on a screen (S521). Subsequently, when NFC tagging is sensed by the in-vehicle device 240 (S523), the mobile device 100 performs step S517.

At steps S505 to S507 of FIG. 5, the in-vehicle device 240 is described as transmitting only the travel route setting information or the location information to the mobile device 100. Alternatively, however, the in-vehicle device 240 may also transmit at least one of version information of the map installed in the in-vehicle device 240 and vehicle type information to the mobile device 100, together with the travel route setting information or the location information. As a result, the update server may compare the received map version information with the latest map version information to determine whether it is necessary to update the received map version information.

In addition, in a case in which map information and software varies based on vehicle type, the update server 200 may further receive vehicle type information from the mobile device 100. As a result, the server 200 may correctly provide software and map information corresponding to the vehicle type.

FIG. 6 is a view illustrating a vehicle software update procedure according to embodiments of the present disclosure.

As shown in FIG. 6, a user NFC tags the mobile device 100 on a software version confirmation screen 600 of the in-vehicle device 240. At this time, the mobile device 100 may receive software version information currently installed in the in-vehicle device 240 from the in-vehicle device 240 through an NFC connection. The mobile device 100 selects a wireless network that does not incur additional data charges based on a subscribed pricing policy and downloads the latest software from the update server 200 over the selected wireless network.

When downloading from the update server 200 is completed, a predetermined popup notification window 610 indicating completion of downloading may be displayed on a screen of the mobile device 100. When an "install now" button displayed on the popup notification window 610 is clicked, the downloaded latest software may be transmitted to the in-vehicle device 240. In addition, when downloading from the update server 200 is completed, the user may simply NFC tag the mobile device 100 on the software version confirmation screen 600 to transmit the downloaded latest software to the in-vehicle device 240.

FIG. 7 is a view illustrating a map information update procedure of an in-vehicle navigation device according to embodiments of the present disclosure.

As shown in FIG. 7, a user NFC tags the mobile device 100 on a navigation execution screen 700 of the in-vehicle device 240. At this time, the mobile device 100 may receive at least one selected from among current location information of the vehicle, currently selected travel route setting information, map version information currently stored in the navigation device, vehicle type and specification information, and the like, from the in-vehicle device 240 through an NFC connection. The type of the information received by the mobile device 100 may be decided based on whether a travel route based on input of a destination has been selected on the navigation screen.

The mobile device 100 selects a wireless network that does not incur additional data charges based on a subscribed pricing policy and downloads map information from the update server 200 over the selected wireless network. At this time, the downloaded map information may be map information necessary to be updated on the selected travel route or relatively small-sized map information based on current location information of the vehicle.

When downloading from the update server 200 is completed, the mobile device 100 may display a predetermined popup notification window 710 indicating completion of downloading on a screen. When an "install now" button displayed on the popup notification window 710 is clicked, the downloaded map information may be transmitted to the in-vehicle device 240. In addition, when downloading from the update server 200 is completed, the user may simply NFC tag the mobile device 100 on the navigation execution screen 700 to transmit the downloaded map information to the in-vehicle device 240.

In embodiments of the present disclosure, in a case in which transmission of software or map information to the in-vehicle device 240 is interrupted or is not possible any longer, the mobile device 100 may alternatively store information regarding a degree of transmission (hereinafter be referred to as "transmission history information") in a predetermined recording region. The transmission history information may include at least one selected from among the amount of data finally transmitted, a percentage of date transmitted, address information of data to be transmitted next on the recording region, and the like. In a case in which transmission can be resumed, the mobile device 100 may resume the interrupted transmission with reference to the stored transmission history information. Consequently, the continued transmission function as described above prevents duplicate transmission of data.

In the above example, the transmission may be interrupted due to stoppage of the vehicle or a user forcibly terminating the operation of the in-vehicle device 240. In this case, upon sensing the above transmission interruption cause, the in-vehicle device 240 may transmit a predetermined control signal notifying that reception of data is not possible any longer to the mobile device 100 through NFC connection. In addition, in a case in which the remaining battery capacity of the mobile device 100 is less than a reference value, the mobile device 100 may determine that transmission is not possible any longer and interrupt transmission of data.

As is apparent from the above description, a vehicle information update method according to the present disclosure has the following effects.

First, the present disclosure has an advantage in that it allows for rapidly and inexpensively updating vehicle software using a mobile device having NFC functionality.

Second, the present disclosure has an advantage in that it allows for partially updating map information of an in-vehicle navigation device for a necessary area using a mobile device having NFC functionality, thereby preventing excessive downloading.

Third, the present disclosure has an advantage in that it allows for identifying a portion necessary to update map information on a travel route set by a user and for providing only map information necessary to be updated to an in-vehicle navigation device, thereby rapidly providing map information changed in real time.

Fourth, the present disclosure has an advantage in that it allows for partially updating map information as needed, thereby minimizing user inconvenience.

Fifth, the present disclosure has an advantage in that it allows for providing a method of selecting a faster and more effective wireless access means in receiving vehicle software and navigation map information from a server.

Sixth, the present disclosure has an advantage in that it allows for downloading the latest software and map information from a server by simply NFC tagging a mobile device having an NFC function on a screen of an in-vehicle device, thereby improving user convenience.

It will be appreciated by persons skilled in the art that that the effects that can be achieved through the present disclosure are not limited to what has been particularly described hereinabove and other advantages of the present disclosure will be more clearly understood from the above detailed description. It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A vehicle information update method in an in-vehicle device interlocked with a mobile device through a near-field communication (NFC) connection comprising:
   sensing NFC tagging on a display screen of the in-vehicle device;
   transmitting first information including at least one item selected from a group consisting of: location information, travel route setting information, software version information, and map version information, according to a type of the display screen, to the mobile device through the NFC connection; and
   receiving latest software or latest map information corresponding to the first information from the mobile device through a first wireless access means in a vehicle, wherein
   the latest software is received when the NFC tagging is sensed while the software version information is displayed on the display screen, and the latest map information is received when the NFC tagging is sensed while the map version information is displayed on the display screen.

2. The vehicle information update method according to claim 1, wherein the first wireless access means is any one of: a NFC connection, a Bluetooth connection, and a Wi-Fi Direct connection.

3. The vehicle information update method according to claim 2, wherein the first wireless access means is selected based on a data size of the latest software or a data size of the latest map information.

4. A vehicle information update method in a mobile device having near-field communication (NFC) functionality comprising:
receiving location information or travel route setting information of a vehicle from an in-vehicle device through NFC tagging;
transmitting a predetermined control message including the location information or the travel route setting information to an update server over a wireless network;
receiving latest software or latest map information corresponding to the location information or the travel route setting information from the update server over the wireless network; and
transmitting the received latest map information to the in-vehicle device using an available wireless access means in the vehicle, wherein
the latest software is received when the NFC tagging is sensed while software version information is displayed on a display screen of the in-vehicle device, and
the latest map information is received when the NFC tagging is sensed while map version information is displayed on the display screen of the in-vehicle device.

5. The vehicle information update method according to claim 4, wherein the location information or the travel route setting information is received by the NFC tagging on a navigation screen of the in-vehicle device.

6. The vehicle information update method according to claim 5, wherein, when the navigation screen is a screen to display a travel route based on an input of a destination, the travel route setting information is received.

7. The vehicle information update method according to claim 5, wherein, when the navigation screen is a screen to display only a current location of the vehicle, the location information is received.

8. The vehicle information update method according to claim 4, wherein, when the travel route setting information is received, the latest map information is changed map information based on the travel route.

9. The vehicle information update method according to claim 4, wherein, when the location information is received, the latest map information is changed map information within a predetermined radius from a current location of the vehicle.

10. A vehicle information update system using near-field communication (NFC) comprising:
an update server to transmit latest vehicle software and latest map information over a wireless network according to an external request;
an in-vehicle device having NFC functionality and being configured to sense NFC tagging through a display screen, the in-vehicle device transmitting first information including at least one item selected from a group consisting of: location information, travel route setting information, software version information, and map version information according to type of the display screen, through NFC connection; and
a mobile device having a processor installed therein to transmit a predetermined control message including the first information to the update server over the wireless network upon receiving the first information from the in-vehicle device, to receive the latest software or the latest map information based on the first information over the wireless network, and to transmit the received latest software or the received latest map information to the in-vehicle device using a wireless access means in the vehicle, wherein
the latest software is received when the NFC tagging is sensed while the software version information is displayed on the display screen, and
the latest map information is received when the NFC tagging is sensed while the map version information is displayed on the display screen.

11. The vehicle information update system according to claim 10, wherein the mobile device selects the wireless access means from a group consisting of: a Wi-Fi Direct connection, an NFC connection, and a Bluetooth connection, based on a size of the latest software or a size of the latest map information.

12. The vehicle information update system according to claim 10, wherein the wireless network includes: i) a wireless Internet network supporting at least one wireless access means selected from a group consisting of: Wi-Fi, Wibro, and Wimax and ii) a mobile communication network supporting at least one wireless access means selected from a group consisting of: WCDMA, HSPA, LTE, and LTE-A.

13. The vehicle information update system according to claim 12, wherein the mobile device selects the wireless access means based on at least one factor selected from a group consisting of: a wireless connection state, data communication expenses, and a data transmission speed per wireless access means.

14. A vehicle information update apparatus interlocked with a mobile device through a near-field communication (NFC) connection comprising:
a short-range communication module having a processor installed therein that is configured to:
sense NFC tagging on a display screen of the apparatus;
transmit first information including at least one item selected from a group consisting of: location information, travel route setting information, software version information, and map version information, according to a type of the display screen, to the mobile device through the NFC connection; and
receive latest software or latest map information corresponding to the first information from the mobile device through a first wireless access means in a vehicle,
wherein
the latest software is received when the NFC tagging is sensed while the software version information is displayed on the display screen, and
the latest map information is received when the NFC tagging is sensed while the map version information is displayed on the display screen.

* * * * *